(12) United States Patent
Huels et al.

(10) Patent No.: US 10,767,728 B2
(45) Date of Patent: Sep. 8, 2020

(54) BELT OR BELT SEGMENT

(71) Applicant: ContiTech Transportbandsysteme GmbH, Hannover (DE)

(72) Inventors: Achim Huels, Barsinghausen (DE); Michael Moeschen-Siekmann, Noerten-Hardenberg (DE); Stanislaus Riepl, Garbsen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 348 days.

(21) Appl. No.: 15/882,746

(22) Filed: Jan. 29, 2018

(65) Prior Publication Data
US 2018/0149233 A1    May 31, 2018

Related U.S. Application Data

(63) Continuation of application No. PCT/EP2016/057303, filed on Apr. 4, 2016.

(30) Foreign Application Priority Data

Jul. 29, 2015 (DE) .................. 10 2015 214 395

(51) Int. Cl.
*F16G 3/02* (2006.01)
*F16G 11/04* (2006.01)
(Continued)

(52) U.S. Cl.
CPC ............... *F16G 3/02* (2013.01); *B62D 55/24* (2013.01); *B65G 15/36* (2013.01); *F16G 3/00* (2013.01); *F16G 11/04* (2013.01)

(58) Field of Classification Search
CPC ..... F16G 3/02; F16G 3/00; F16G 3/04; Y10T 24/1632; Y10T 24/1636
(Continued)

(56) References Cited

U.S. PATENT DOCUMENTS 224,951 A * 2/1880 Redsecker ............... F16G 3/00
                                                                 24/32
733,393 A * 7/1903 Heron ..................... F16G 3/00
                                                                474/253
(Continued)

FOREIGN PATENT DOCUMENTS

| DE | 1101062 B | 3/1961 |
|---|---|---|
| WO | 0138756 A1 | 5/2001 |
| WO | 2013068170 A1 | 5/2013 |

OTHER PUBLICATIONS

International Search Report dated Jun. 23, 2016 of international application PCT/EP2016/057303 on which this application is based.

*Primary Examiner* — Henry Y Liu
(74) *Attorney, Agent, or Firm* — David L. Cate; Gregory Adams

(57) ABSTRACT

A belt or a belt segment has a plurality of strength members that extend in a longitudinal direction (X) and are arranged parallel to one another, and a connecting element which forms one end of the belt or belt segment and is configured to be connected to a further connecting element at the other end of the belt or to one end of a further belt segment. The ends of the strength members are held by the connecting element. The belt or belt segment is characterized in that the ends of the strength members are connected to at least one clamping body in a force-fitting manner, wherein the clamping body can be held by the connecting element in a force-fitting manner at least in the longitudinal direction (X).

15 Claims, 13 Drawing Sheets

(51) Int. Cl.
*B65G 15/36* (2006.01)
*F16G 3/00* (2006.01)
*B62D 55/24* (2006.01)

(58) Field of Classification Search
USPC .......................................... 474/253, 255, 256
See application file for complete search history.

(56) References Cited

U.S. PATENT DOCUMENTS

| | | | | |
|---|---|---|---|---|
| 923,546 A * | 6/1909 | Maxwell | F16G 3/02 | 24/33 B |
| 1,426,796 A * | 8/1922 | Walker | F16G 3/02 | 474/255 |
| 1,427,856 A * | 9/1922 | Rutz | F16G 1/26 | 474/247 |
| 1,614,751 A * | 1/1927 | Mitchell | F16G 11/08 | 24/33 R |
| 1,653,624 A * | 12/1927 | Gingras | F16G 3/02 | 24/33 B |
| 2,158,007 A * | 5/1939 | Ellis | D06F 83/00 | 24/33 C |
| 2,178,558 A * | 11/1939 | Cady | F16G 7/00 | 474/257 |
| 2,179,655 A * | 11/1939 | Cutler | F16G 1/04 | 474/90 |
| 2,224,532 A * | 12/1940 | Ziller | F16G 3/02 | 24/33 B |
| 2,362,949 A * | 11/1944 | Tingley | F16G 7/00 | 24/33 B |
| 2,446,311 A * | 8/1948 | Traxler | F16G 7/00 | 474/257 |
| 2,468,898 A * | 5/1949 | Shingle | F16G 1/02 | 474/255 |
| 2,496,695 A * | 2/1950 | Brunner | F16G 7/00 | 24/31 W |
| 2,727,399 A * | 12/1955 | Hjort | F16G 1/04 | 474/255 |
| 2,814,845 A * | 12/1957 | Hjort | F16G 3/00 | 24/33 K |
| 2,847,864 A * | 8/1958 | Waugh | F16G 7/00 | 474/257 |
| 3,105,390 A * | 10/1963 | Wiese | B65G 15/42 | 474/205 |
| 3,316,599 A * | 5/1967 | Wagner | D21F 7/10 | 24/31 H |
| 3,327,359 A * | 6/1967 | Wiese | F16G 11/00 | 24/37 |
| 3,438,096 A * | 4/1969 | McComb | F16G 3/04 | 24/33 B |
| 3,581,348 A * | 6/1971 | Lister | F16G 3/04 | 24/31 H |
| 3,664,490 A * | 5/1972 | Maruyama | B65G 17/02 | 198/847 |
| 3,735,451 A * | 5/1973 | Haythornthwaite | F16G 3/04 | 24/33 C |
| 3,762,232 A * | 10/1973 | Muller | F16G 3/00 | 74/89.22 |
| 3,945,263 A * | 3/1976 | Simonsen | F16G 3/00 | 198/847 |
| 3,962,754 A * | 6/1976 | Stolz | F16G 3/04 | 24/33 B |
| 4,023,239 A * | 5/1977 | Stolz | F16G 3/02 | 24/33 P |
| 4,298,343 A * | 11/1981 | Redmond, Jr. | B29D 29/08 | 24/38 |
| 4,344,209 A * | 8/1982 | Harwood | F16G 3/02 | 139/383 A |
| 4,364,421 A * | 12/1982 | Martin | D03D 3/04 | 139/383 AA |
| 4,489,828 A * | 12/1984 | Stipdonk | B65G 15/34 | 198/847 |
| 4,582,505 A * | 4/1986 | Stolz | F16G 3/04 | 24/33 P |
| 4,650,446 A * | 3/1987 | Pinto | F16G 3/00 | 474/253 |
| 4,653,156 A * | 3/1987 | Stolz | F16G 3/04 | 24/31 B |
| 4,671,403 A * | 6/1987 | Schick | F16G 3/02 | 198/844.2 |
| 4,721,497 A * | 1/1988 | Jager | B62D 55/213 | 24/37 |
| 4,781,666 A * | 11/1988 | Acee, Sr. | F16G 3/00 | 24/16 PB |
| 4,846,770 A * | 7/1989 | Lane | F16G 3/00 | 474/253 |
| 4,911,683 A * | 3/1990 | Legge | F16G 3/02 | 428/223 |
| 4,912,812 A * | 4/1990 | Henn | F16G 3/00 | 24/31 R |
| 4,944,716 A * | 7/1990 | Graff | F16G 3/02 | 474/255 |
| 5,015,220 A * | 5/1991 | Legge | D21F 1/0054 | 474/253 |
| 5,020,658 A * | 6/1991 | Jager | A01D 17/10 | 198/844.2 |
| 5,040,282 A * | 8/1991 | Edwards | B62D 55/088 | 29/436 |
| 5,048,675 A * | 9/1991 | Nadalutti | F16G 3/04 | 198/844.2 |
| 5,092,823 A * | 3/1992 | Longo | F16G 1/00 | 474/253 |
| 5,095,590 A * | 3/1992 | Schick | F16G 3/04 | 198/844.2 |
| 5,099,548 A * | 3/1992 | Loosli | B65G 15/52 | 198/844.2 |
| 5,246,101 A * | 9/1993 | Flebbe | F16G 3/00 | 198/844.2 |
| 5,308,292 A * | 5/1994 | Mistry | F16G 1/00 | 474/207 |
| 5,327,823 A * | 7/1994 | Clevenger, Jr. | A01F 15/18 | 100/88 |
| 5,348,143 A * | 9/1994 | Musil | B65G 15/30 | 198/844.2 |
| 5,419,744 A * | 5/1995 | Kagebeck | F16B 2/08 | 474/253 |
| 5,632,701 A * | 5/1997 | Neel | B65G 17/08 | 24/33 B |
| 6,053,308 A * | 4/2000 | Vogrig | F16G 3/02 | 198/844.2 |
| 6,196,378 B1 * | 3/2001 | Borner | F16G 3/04 | 198/844.2 |
| 6,374,462 B1 * | 4/2002 | Jakob | F16G 3/04 | 24/33 B |
| 6,488,144 B2 * | 12/2002 | Winkelman | F16B 19/06 | 198/844.2 |
| 6,689,247 B1 * | 2/2004 | Steven | F16G 3/10 | 156/137 |
| 6,896,125 B2 * | 5/2005 | Webster | B65G 15/52 | 198/844.2 |
| 7,261,929 B2 * | 8/2007 | Allen | B29C 66/1142 | 198/844.2 |
| 7,762,390 B2 * | 7/2010 | Suelzle | F16G 3/16 | 198/844.2 |
| 8,365,906 B2 * | 2/2013 | Moeschen-Siekmann | F16G 3/09 | 198/844.2 |
| 8,684,170 B2 * | 4/2014 | Jakob | F16G 3/04 | 198/844.2 |
| 8,770,394 B2 * | 7/2014 | Huels | F16G 3/02 | 198/844.2 |
| 9,200,696 B2 * | 12/2015 | Jakob | F16G 3/00 | |
| 9,506,526 B2 * | 11/2016 | Moeschen-Siekmann | F16G 3/02 | |
| 2003/0146072 A1 * | 8/2003 | Rubino | F16G 3/02 | 198/844.2 |

(56) References Cited

U.S. PATENT DOCUMENTS

| | | |
|---|---|---|
| 2012/0205223 A1* | 8/2012 | Moeschen-Siekmann ................ F16G 3/09 198/844.2 |
| 2013/0213774 A1 | 8/2013 | Huels et al. |
| 2014/0230194 A1 | 8/2014 | Moeschen-Siekmann et al. |
| 2015/0075951 A1* | 3/2015 | Moeschen-Siekmann ................ F16G 3/02 198/844.2 |

* cited by examiner

BELT OR BELT SEGMENT

CROSS REFERENCE TO RELATED APPLICATIONS

This application is a continuation application of international patent application PCT/EP2016/057303, filed Apr. 4, 2016 designating the United States and claiming priority from German application 10 2015 214 395.3, filed Jul. 29, 2015, and the entire content of both applications is incorporated herein by reference.

BACKGROUND OF THE INVENTION

Belts closed in an endless manner represent annular elements which can be used for example as drive belts such as V-belts, for example, for power transmission. However, they can also be used as conveyor belts in order to transport for example loose bulk materials. They can also be used as caterpillar tracks in order to move the vehicle around in the case of tracked vehicles.

Belts of this type generally run around a drive and further guide or support rollers, in order to transmit the drive power to an output element (V-belt), in order to utilize the drive power for transporting material (conveyor belt) or to move a vehicle around (caterpillar track). To this end, these belts have a predetermined elasticity, which can be achieved for example by the use of an elastomeric material, for example rubber, as the base material of the belt. Moreover, these belts usually have one or more strength members in the longitudinal direction for transmitting the tensile forces in the running direction of the belt. These strength members may be steel cables, for example, which allow particularly high force transmission, although textile fabrics are also typical as strength members.

Belts of this type can be produced, for example as V-belts, to some extent in an already closed manner. In most cases, for example as conveyor belts or caterpillar tracks, the belts are produced in a usually open manner, that is, as an elongate body, on account of their length in the longitudinal direction, and are also transported to the site of application in this state. They are then closed in an endless manner there. In the process, a belt can be closed in an inherently endless manner via its two ends, or at least two belt segments can be arranged one after the other and be conjointly closed in an endless manner to form one belt. Closing in an endless manner can take place for example by the two ends being joined together by vulcanization, but this precludes nondestructive separation of the ends and thus opening of the belt, for instance in the case of wear or damage. Furthermore, this requires a great deal of effort at the application site.

Therefore, it is known for the ends of the strength members to be left free of elastomeric material, or not to be covered, at the two ends of the open belt, and for these ends to be connected mechanically. This can take place, for example, in that the respective ends are clamped in a respectively common coupling element and the two coupling elements are connected together, for example in a hinge-like manner, via a coupling bar. As a result of this mechanical clamping connection being divided between two coupling elements which are then rotatable with respect to one another as a joint, the flexibility of the belt as a whole is intended to be limited as little as possible. This may be required in particular in the case of tight deflection radii.

U.S. Pat. No. 8,770,394 B2 and U.S. Pat. No. 9,506,526 B2 show a belt made of an elastomeric material having a strength member ply made of steel cables that extend in the longitudinal direction of the belt and are arranged parallel to one another. The ends of the steel cables are each clamped in a force-fitting manner by press-fitting in a connecting element in the form of a belt-end body. The two connecting elements each have crenelated protrusions that are directed toward one another and laterally overlap one another and are provided with transverse bores. A coupling bar, with regard to which the two belt-end bodies can rotate with respect to one another, can be passed through the transverse bores. As a result, the belt is closed in an endless manner and the two belt ends are coupled together in a hinge-like manner.

A drawback here is that the belt-end bodies can warp as a result of the press-fitting during the clamping of the ends of the steel cables. This can result in increased wear to the hinge-like coupling, since the protrusions can rub against one another. As a result, the protrusions, and also the bores in the joint, can become weakened to such an extent that the hinge-like coupling can tear.

SUMMARY OF THE INVENTION

It is an object of the invention to provide a belt or a belt segment of the type described at the outset which has an increased service life in relation to known solutions. In particular, the warping which can arise as a result of the press-fitting of the ends of the strength members in the connecting element is intended to be reduced or avoided.

The object can, for example, be achieved by a belt or belt segment including: a plurality of strength members each having a strength member end; the belt or belt segment having a first end and a second end and defining a longitudinal direction (X); the strength members extending in the longitudinal direction (X) and being arranged parallel to one another; a connecting element which forms the first end of the belt or belt segment and is configured to be connected to a further connecting element at the second end of the belt or to an end of a further belt segment; the strength member ends being held by the connecting element; at least one clamping body; the strength member ends being connected to the at least one clamping body in a force-fitting manner; and, the connecting element being configured to hold the at least one clamping body in a force-fitting manner at least in the longitudinal direction (X).

The invention therefore relates to a belt or a belt segment having a plurality of strength members that extend in a longitudinal direction and are arranged parallel to one another. The strength members are preferably steel cables which can transmit high tensile forces. The longitudinal direction should be understood to be the direction in which the belt or belt segment is or can be closed in an endless manner. The transverse direction, which can also be referred to as the width, and the height or thickness of the belt or belt segment extend perpendicularly thereto. A belt can be closed in an endless manner by the connection of its two ends, or a plurality of belt segments can be closed in an endless manner to form one belt via the connection of their ends.

The belt or the belt segment furthermore has a connecting element which forms one end of the belt or belt segment and is configured to be connected to a further connecting element at the other end of the belt or to one end of a further belt segment. The ends of the strength members may be held by the connecting element. The connecting element is preferably configured in a hinge-like manner such that it can form a rotatable joint with a corresponding second connecting element at the other end of the belt or at one end of a further belt segment. This may allow this coupling region to adapt better to a deflection of the closed belt about a drum, for example.

This coupling between the connecting elements is preferably realized by a coupling bar which is passed in the transverse direction through bores of the crenelated protrusions of the connecting elements and secured. As a result, this connection can be configured to also be releasable.

The belt or belt segment is characterized in that the ends of the strength members are connected to at least one clamping body in a force-fitting manner, wherein the clamping body can be held by the connecting element in a force-fitting manner at least in the longitudinal direction. The clamped connection between the ends of the strength members and the clamping body and/or of the clamping body to the connecting element can preferably take place by press-fitting.

The present invention is thus based on the concept of achieving a functional separation of the connection of the ends of the strength members to the connecting element in this way. This is because the prior art has previously disclosed clamping the ends of the strength members in the material of the connecting element directly by press-fitting and in this way establishing a force-fitting connection directly between the strength members and the connecting element.

According to an aspect of the invention, the clamped connection of the ends of the strength members to the connecting element now takes place via a clamping body located in between, which represents a separate body from the connecting element. The clamping body can, in this way, be connected to the ends of the strength members in a force-fitting manner and for its part be received by the connecting element such that a force-fitting connection can be established between the clamping body and connecting element in the longitudinal direction. In this way, the forces which are required to establish the force-fitting connection between the ends of the strength members and the clamping body and between the clamping body and the connecting element, for example by press-fitting, no longer act on the connecting element in such a way and undesirably deform the latter, as may previously be the case with the direct force-fitting connection of the ends of the strength members to the connecting element. As a result, the warping of the connecting element that has previously arisen can be avoided or at least reduced. This can also reduce or even avoid the increased abrasion generated thereby between two connecting elements, and thus increase the service life of the belt or belt segment, or the coupling thereof. At the same time, the high durability of the force-fitting connection can be maintained.

It is furthermore advantageous that the materials of the clamping body and of the connecting element can now be configured in an optimal manner for the respective purpose. To this end, different materials can be used, for example a steel having good plastic deformability and at the same time high strength for the clamping body, and a hard or hardenable steel having high wear resistance and tensile strength for the connecting element. As a result, the deformability of the clamping body during press-fitting and the stability of the connecting element under tensile load can be optimized in each case.

It is advantageous, when a plurality of clamping bodies are used, that force transmission, acting uniformly on the strength members, between the strength members and connecting element can be achieved even in the case of strength members with different lengths or clamping bodies that are positioned differently in the longitudinal direction. In other words, in the case of a form-fitting connection between the clamping bodies and connecting element, it may be possible, on account of differences in position of the clamping bodies in the longitudinal direction, for the form-fitting force transmission not to occur for all clamping bodies, such that the other clamping bodies are loaded more greatly or even excessively under certain circumstances, and this may result in some or even all of the strength members tearing. This can be avoided by a force-fitting connection of the clamping bodies to the connecting element.

A "loose" clamping body, that is, one not held in a form-fitting manner, could also be lifted out of the connecting element, in particular during the displacement on a deflection drum or the like, and this can likewise be avoided by the force-fitting connection.

The connecting element is preferably configured such that it can be integrated fully into the cross section of the belt or belt segment. This should be understood as meaning that the connecting element does not protrude beyond the contour of the belt or belt segment either in terms of height or in terms of width. In this way, any influence on the running behavior of the belt that is closed in an endless manner can be avoided.

According to an aspect of the present invention, the material of the clamping body is softer than the material of the connecting element. "Soft" should be understood here as meaning better flowability or plastic deformability of the material of the clamping body compared with the material of the connecting element. For example, a high-grade stainless steel such as V4A, for example, can be used as the material of the clamping body. A hard or hardenable steel, for example, can be used as the material of the connecting element. The comparatively soft material of the clamping body facilitates ready press-fitting both to the ends of the strength member, such as steel cables, for example, and to the connecting element. This can increase the clamping effect at an identical pressing force, or reduce the pressing force required for establishing the force-fitting connection. As a result of its comparatively great hardness, the material of the connecting element can absorb high loads and, as a result, counteract warping. It is likewise possible for wear by abrasion to be reduced in principle as a result.

It is also advantageous here that the connecting element can be produced by a casting or a forging, and this can reduce the production costs. At the same time, the clamping body can be realized by a small and geometrically simple body, and this can likewise reduce the production costs.

According to a further aspect of the present invention, at least two ends of the strength members are connected to a common clamping body in a force-fitting manner. A relatively large clamping body may be easier to produce, to handle and to fit, and this can reduce the production and assembly costs.

Preferably, all the ends of the strength members are clamped in a common clamping body. This has the advantage that the clamped strength members are collectively easier to handle.

According to a further aspect of the present invention, at least two ends of the strength members are each connected individually to a clamping body in a force-fitting manner. As a result, smaller clamping bodies can be used, and this can reduce the diversity of variants.

Preferably, all the ends of the strength members are each connected to a single clamping body. As a result, a unitary clamping body can be used repeatedly, even for belts or belt segments having a different number of strength members, and this can reduce the production costs. In other words, it is possible to dispense with the need to produce and provide different clamping bodies for different belts or belt segments.

According to a further aspect of the present invention, the connecting element has at least one clamping body receptacle in which at least one end, provided with a clamping body, of a strength member can be received and held in a force-fitting manner at least in the longitudinal direction. As a result of the clamping body receptacle within the dimensions of the connecting element, a space can be created in which the clamping body can be received by the connecting element in order to be held in a force-fitting manner.

According to a further aspect of the present invention, the clamping body receptacle is configured to receive a clamping body to which the ends of a plurality of strength members are connected in a force-fitting manner. As a result, a space for receiving such a clamping body can be created by the connecting element, the receptacle being able to be produced more easily and quickly, on account of its size, than a plurality of smaller clamping body receptacles.

According to a further aspect of the present invention, the clamping body receptacle is configured to receive a clamping body to which the end of one strength member is connected in a force-fitting manner. As a result, a space for receiving such a clamping body is created by the connecting element, that is, for very small clamping bodies which can each receive only a single end of a strength member. It is advantageous here that a very small clamping body can be press-fitted more easily and better, both with respect to the end of the strength member and to the connecting element, than larger bodies, such that a better and more durable force-fitting connection can be achieved in both directions, that is, toward both contact partners.

According to a further aspect of the present invention, the connecting element has at least two clamping body receptacles in which in each case at least one end, provided with a clamping body, of a strength member can be received and held in a force-fitting manner at least in the longitudinal direction, wherein the two clamping body receptacles are separated from one another in a transverse direction by a web extending in the longitudinal direction. In this way, the transmission of tensile forces in the longitudinal direction can be improved, because the tensile forces can be transmitted not only via the lateral edges of the connecting element but also directly by the webs between the clamping body receptacles. As a result, the deformation of the connecting element can be reduced. At the same time, the force-fitting connection between the clamping bodies and the connecting element can take place laterally via the longitudinally extending webs of the connecting element, with the result that the force-fitting contact area between the clamping bodies and connecting element can be increased and thus the force-fitting connection improved.

According to a further aspect of the present invention, the connecting element has at least one strength member leadthrough through which at least one strength member can be passed in the longitudinal direction into a clamping body receptacle. The region of the connecting element through which a strength member can pass out through the strength member leadthrough into the clamping body receptacle forms a stop for additional form-fitting retention of the clamping body by the connecting element.

According to a further aspect of the present invention, the strength member leadthrough is configured as a bore through the connecting element. In this way, the strength member leadthrough can be surrounded all around by the material of the connecting element, such that the forces of the force-fit and/or form-fit can be transmitted uniformly. Greater stability can be created as a result. In this case, it is necessary for the ends of the strength members to be plugged through the bores into the clamping body receptacle, where they are introduced into corresponding receptacles of the clamping body and can then be press-fitted therein.

According to a further aspect of the present invention, the strength member leadthrough is configured as a groove through the connecting element. In other words, the material of the connecting element is interrupted in its height, such that those ends of the strength members that are provided with the clamping body can be placed into the grooves from one side. In the process, the clamping body is placed into the clamping body receptacle at the same time. In this way, the press-fitting of the clamping body to the end of the strength member can take place independently of the connecting element in a first step, such that the clamping body can be placed into the connecting element with the clamped end of the strength member and can be press-fitted to the connecting element there in a further step.

According to a further aspect of the present invention, the belt or belt segment furthermore has a cover which can close the groove and/or the clamping body receptacle perpendicularly to the longitudinal direction. In this way, the strength members introduced into the grooves, or the clamping body received in the clamping body receptacle, can be protected there by the cover. Furthermore, the coefficients of friction of the joint at the surface of the belt and the visual appearance of the belt can be influenced by the cover.

According to a further aspect of the present invention, the strength member leadthrough is configured in a widened manner in the longitudinal direction in the direction away from the ends of the strength members. In this way, buckling of the strength members can be avoided in particular in the event of the belt being bent, for example on a drum. In other words, it may be possible for the strength members to always extend in the neutral axis. This avoids damage to the strength members and increases the service life thereof, and thus the service life of the belt.

Preferably, the widening of the strength member leadthrough is configured in a conical manner. As a result, the above-described advantages can be implemented easily. This is likewise the case for a hyperbolic shape of the widening.

According to a further aspect of the present invention, the belt or belt segment has an elastomeric main body in which the strength members are embedded, wherein the ends of the strength members are not covered by the material of the elastomeric main body. The material of the elastomeric main body is preferably a vulcanized rubber. In this way, an elastic belt or an elastic belt segment can be created. The lack of covering of the ends of the strength members should be understood here as an external lack of covering by the elastomeric material of the main body, such that the ends of the strength members such as steel cables, for example, appear to be bare toward the outside and, on account of their small cross section, can be introduced into the clamping body receptacles of the clamping body and be press-fitted therein.

According to a further aspect of the present invention, the connecting element has a semicircular concavity on the internal belt side thereof. This concavity is configured in the manner of a half-shell and corresponds in terms of its radius to the radius of, for example, a drum on which the belt, or the coupling region of the latter, can be deflected. This concavity facilitates rolling on the drum and can help to avoid buckling of the strength members, such that the strength members can remain in the neutral axis at all times, even when rolling. As a result, any buckling of the strength members can be avoided and the service life thereof, and thus the service life of the belt, can be increased.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
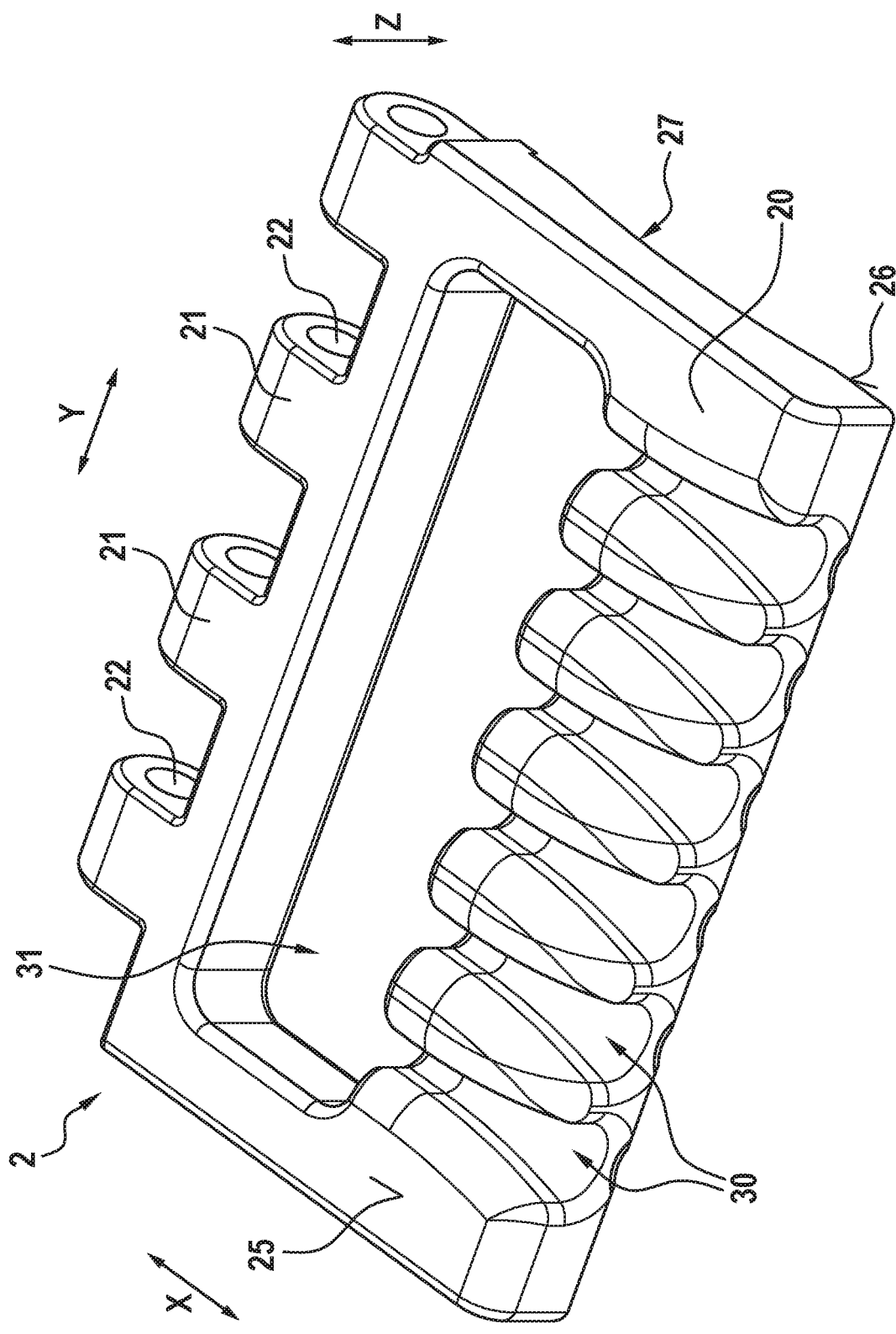
FIG. 1 shows a perspective schematic illustration from above of a connecting element by itself, according to a first embodiment.
Figure 2:
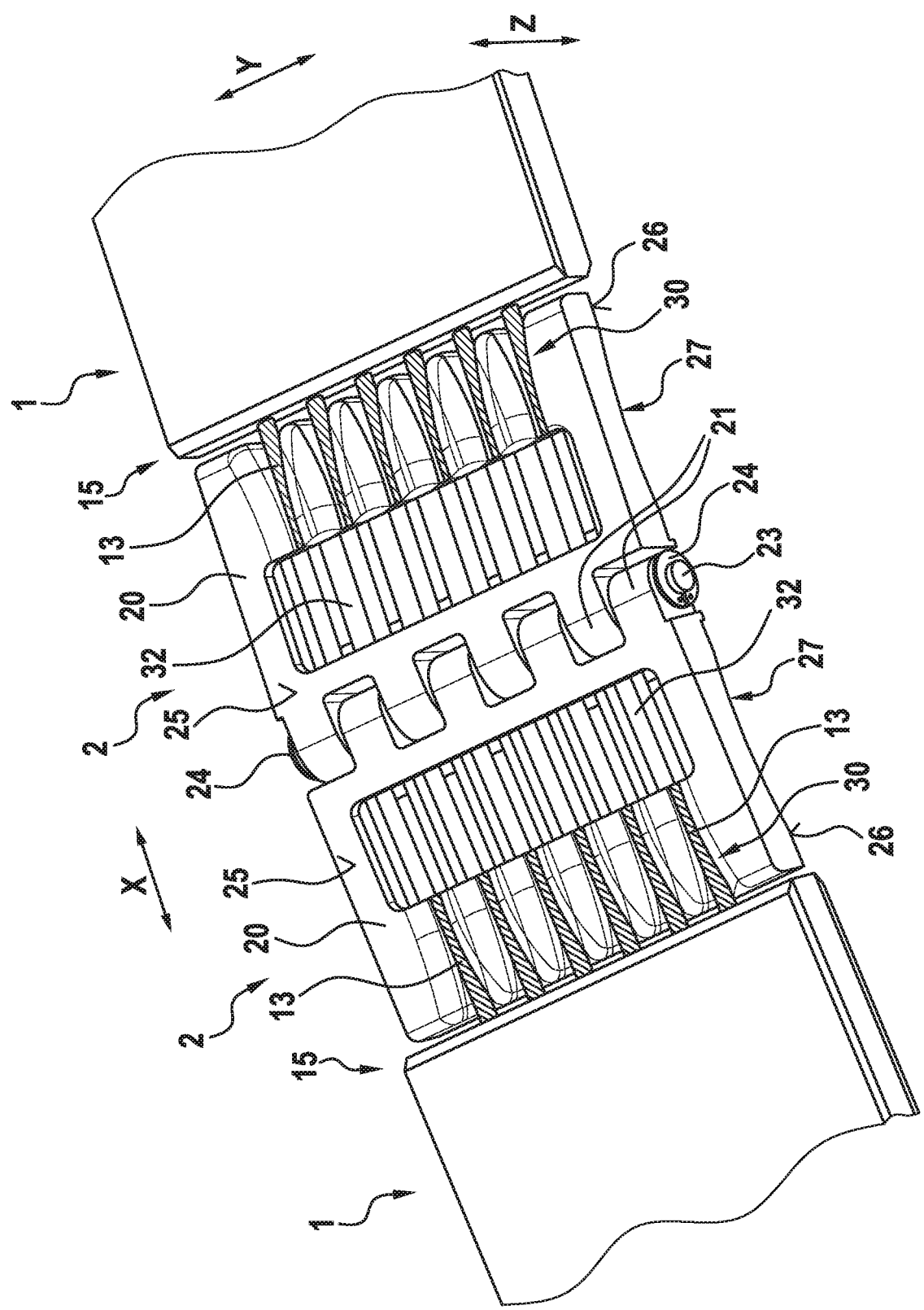
FIG. 2 shows a view from above of a belt closed in an endless manner with connecting elements according to the first embodiment.
Figure 3:
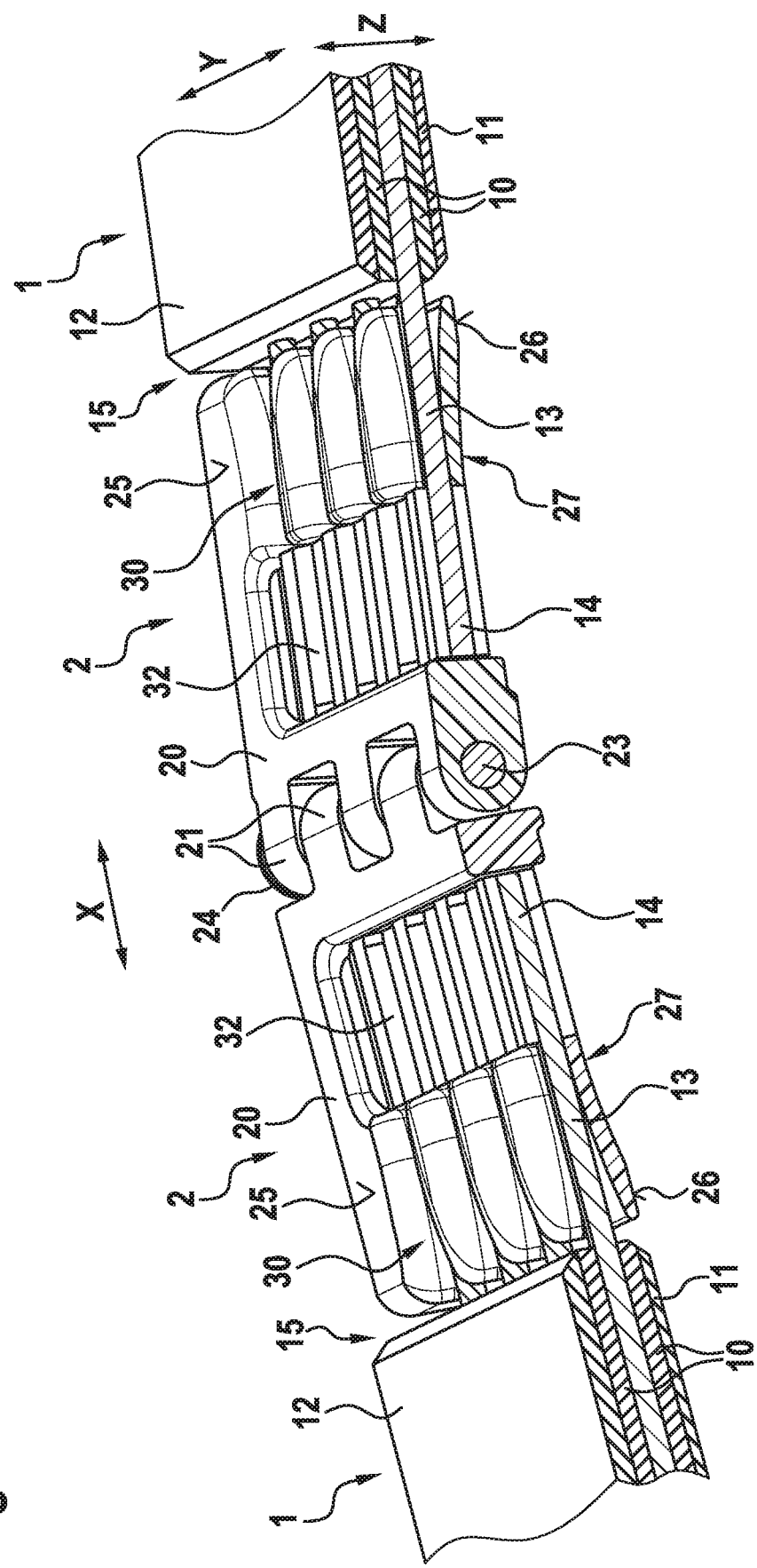
FIG. 3 shows a section in the longitudinal direction through the illustration in FIG. 2.
Figure 4:
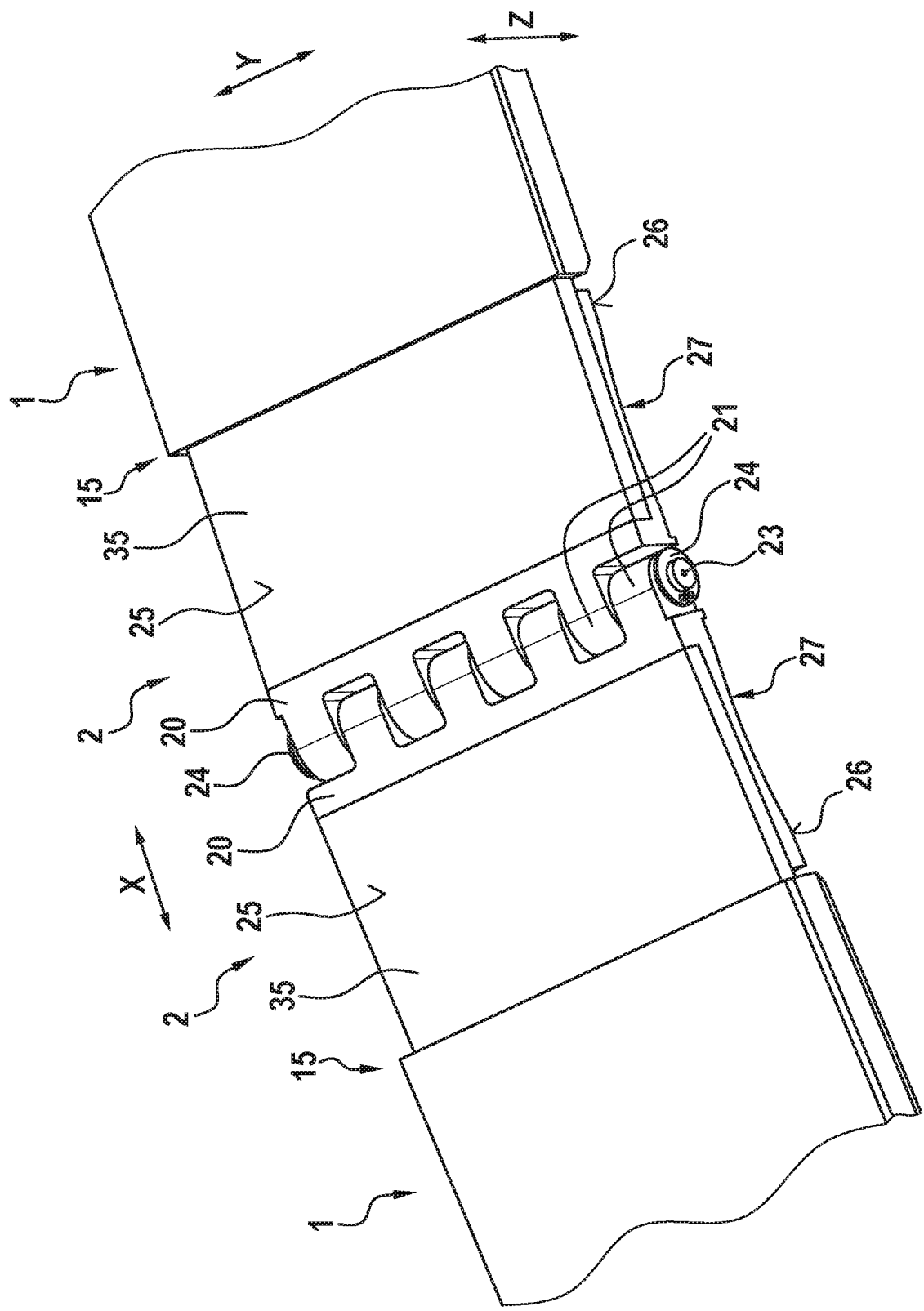
FIG. 4 shows the belt closed in an endless manner from FIG. 2 with covers.

FIG. 1 shows a perspective schematic illustration from above of a connecting element 2 by itself, according to a first embodiment. FIG. 2 shows a view from above of a belt 1 closed in an endless manner with connecting elements 2 according to the first embodiment. FIG. 3 shows a section in the longitudinal direction X through the illustration in FIG. 2. FIG. 4 shows the belt 1 closed in an endless manner from FIG. 2 with covers 35.

The belt 1 is closed in an endless manner in a longitudinal direction X. A transverse direction Y, which can also be designated the width Y, extends perpendicularly thereto. The height Z, which can also be designated the thickness Z, extends in each case perpendicularly thereto. These directional indications in Cartesian coordinates apply correspondingly for a connecting element 2 which is illustrated on its own in FIG. 1.

The connecting element 2 has a main body 20 which is made of a hard or hardenable steel. On its one edge in the longitudinal direction X, the main body 20 has a plurality of crenelated protrusions 21 which each have transverse bores 22 extending in the transverse direction Y. The main body 20 has an external belt side 25 which forms the top side 25 of the main body 20. The main body 20 also has an internal belt side 26 which forms the underside 26 of the main body 20. In this first embodiment, the underside 26 of the main body 20 has a concavity 27 which is configured in a semicircular manner and the radius of which corresponds to the outside radius of a drum, for example, about which the belt 1 can circulate.

The connecting element 2 also has a clamping body receptacle 31 which is configured as a rectangular cutout within the main body 20 (cf. FIG. 1). The clamping body receptacle 31 is configured so as to be open toward the top side 25 and toward the underside 26. A plurality of strength member leadthroughs 30 extend from the clamping body receptacle 31 in the longitudinal direction X in the direction away from the crenelated protrusions 21, through the main body 20, and are configured in a widened manner toward the belt 1. The strength member leadthroughs 30 are embodied in the form of grooves 30 in this first embodiment.

A correspondingly formed clamping body 32 has been clamped in the clamping body receptacle 31 by press-fitting (cf. FIGS. 2 and 3). Within the clamping body 32, the ends 14 of strength members 13 in the form of steel cables 13 have been clamped by press-fitting (cf. in particular FIG. 3). To this end, the steel cables 13 are not covered, at their ends 14, by the material of an elastomeric main body 10 of the belt 1. In its height Z, the elastomeric main body 10 has a lower elastomeric cover layer 11 and an upper elastomeric cover layer 12. With the clamping body 32 and the connecting element 2, the uncovered ends 14 of the steel cables 13 collectively form the belt end 15. The two connecting elements 2 of two belt ends 15 of the same belt 1 or of two belt segments 1 are connected together in an articulated manner via a coupling bar 23 through their transverse bores 22. The coupling bar 23 is secured in this position by coupling bar securing means 24 on both sides in the transverse direction Y.

According to an aspect of the invention, the ends 14 of the steel cables 13 are clamped in a common clamping body 23 by press-fitting. The material of the clamping body 32 is, to this end, configured so as to be readily plastically deformable in a corresponding manner such that it can be readily press-fitted and a secure and durable force-fitting connection between the clamping body 32 and the ends 14 of the steel cables 13 can be established. At the same time, the material of the clamping body 32 is configured to be hard enough to be able to securely maintain this force-fitting connection. To this end, a soft steel such as V4A, for example, can be used. The press-fitting of the ends 14 of the steel cables 13 in the clamping body 32 can in this case take place independently of the connecting element 2, such that the ends 14 of the steel cables 13 with the press-fitted clamping body 32 can be placed together into the connecting element 2. In this case, the clamping body 32 is received by the clamping body receptacle 31. The steel cables 13 can be placed into the grooves 30 from above. The clamping body 32 is then press-fitted, within the clamping body receptacle 31, to the latter or to the connecting element 2, such that the clamping body 32 can be held in the clamping body receptacle 31 in a force-fitting manner. In this way, the tensile force, acting in the longitudinal direction X, of the belt 1 can be transmitted, according to an aspect of the invention, in a force-fitting manner from the steel cables 13 to the connecting elements 2 via the clamping bodies 32. To this end, the connecting elements 2 are made of a tension-resistant material such as a hardened steel, for example.

In order to be able to better protect the clamping bodies 32 and the placed steel cables 13 from external influences, these are provided with covers 35 from above (cf. FIG. 4). These covers 35 can be fastened to the lateral edges in the transverse direction Y of the connecting elements 2 by a latching mechanism, for example.

Figure 5:
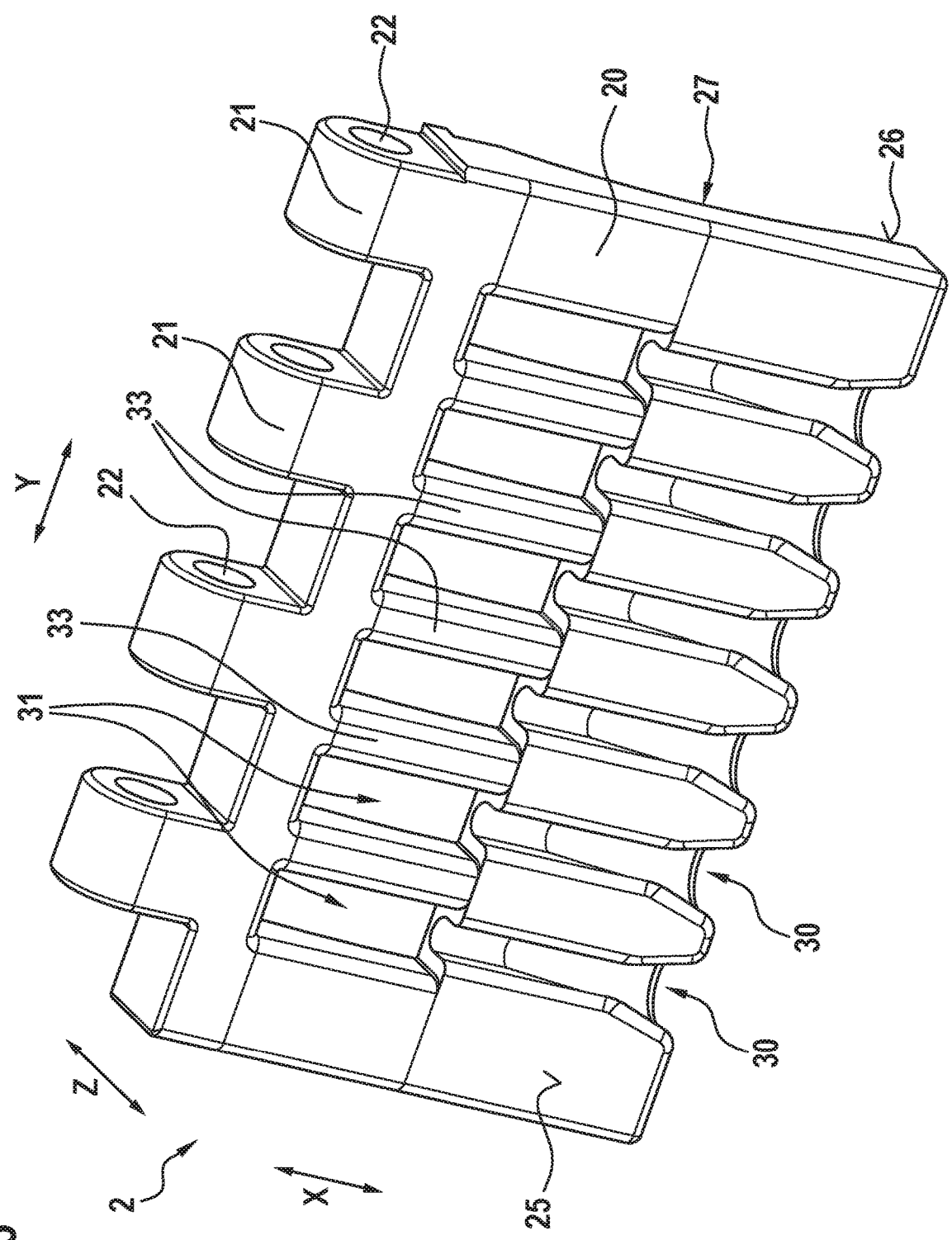
FIG. 5 shows a perspective schematic illustration from above of a connecting element by itself, according to a second embodiment.
Figure 6:
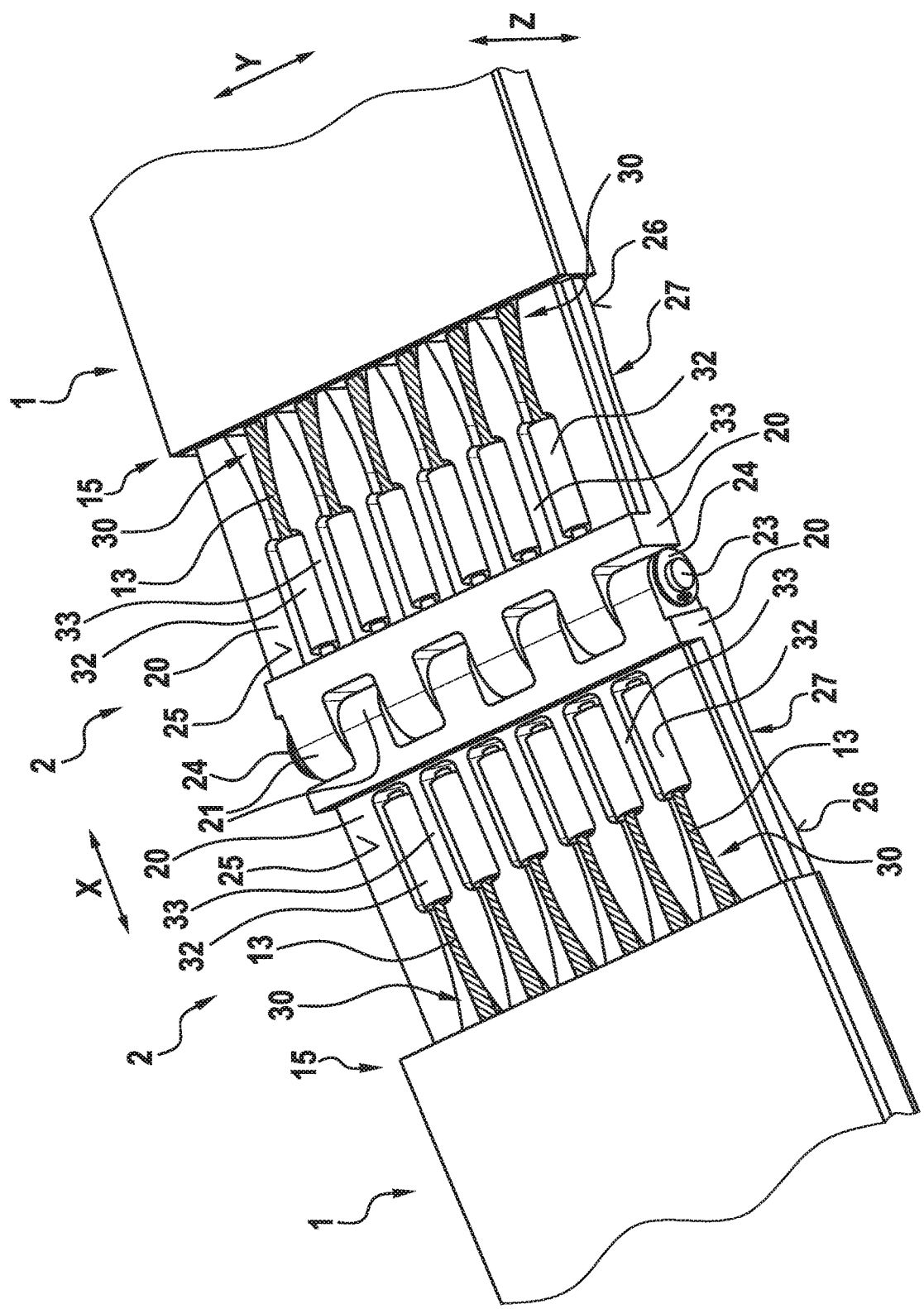
FIG. 6 shows a view from above of a belt closed in an endless manner with connecting elements according to the second embodiment.
Figure 7:
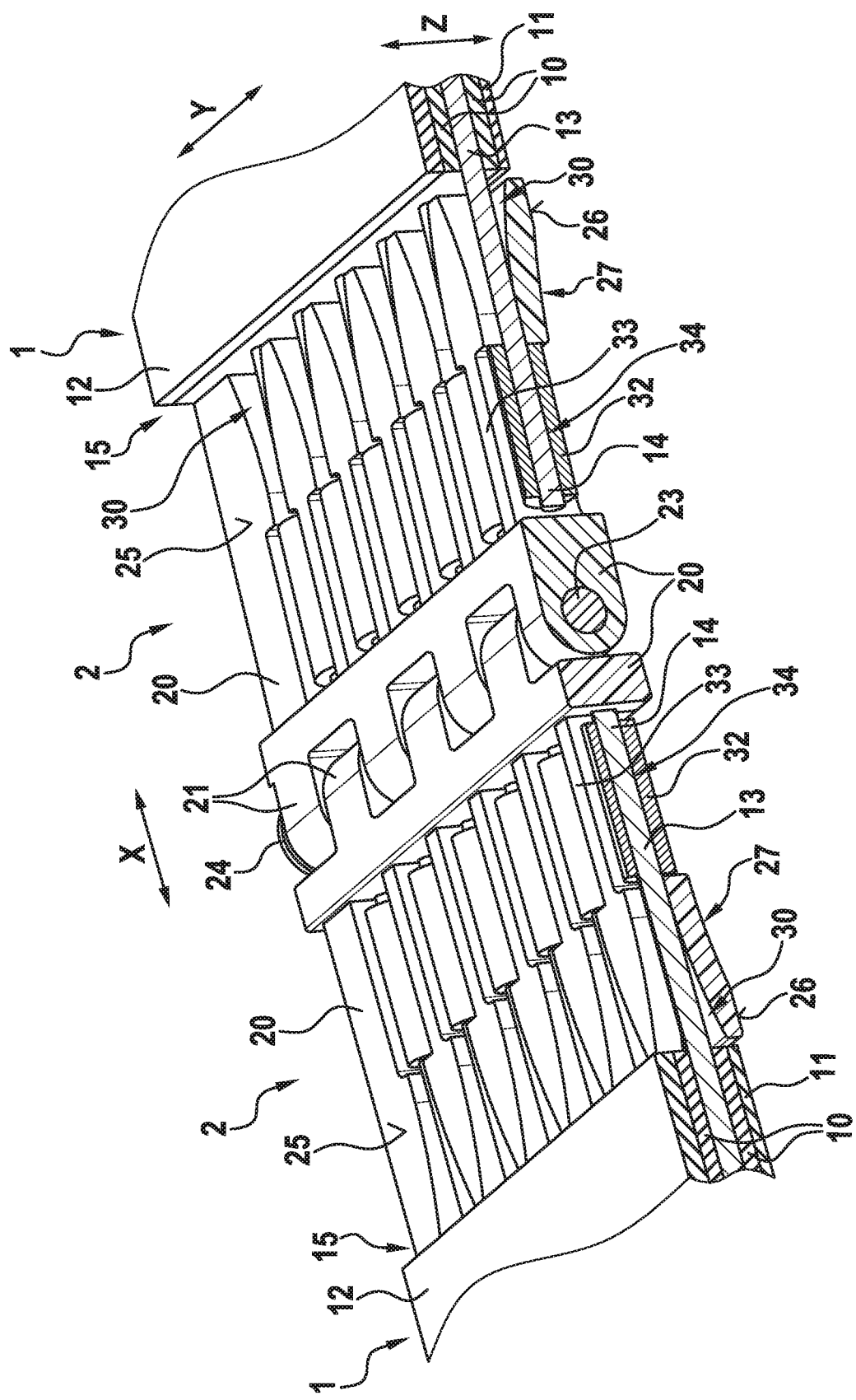
FIG. 7 shows a section in the longitudinal direction through the illustration in FIG. 6.

FIG. 5 shows a perspective schematic illustration from above of a connecting element 2 by itself, according to a second embodiment. FIG. 6 shows a view from above of a belt 1 closed in an endless manner with connecting elements 2 according to the second embodiment. FIG. 7 shows a section in the longitudinal direction X through the illustration in FIG. 6.

The connecting element 2 according to the second embodiment differs from the connecting element 2 according to the first embodiment in that the clamping body receptacle 31 is divided into a plurality of individual clamping body receptacles 31 by a plurality of webs 33 formed in the longitudinal direction X. The webs 33 can transmit forces in the longitudinal direction X and, as a result, can counteract any warping of the connecting element 2 on account of loads in the longitudinal direction X. Furthermore, lateral press-fitting in the transverse direction Y of each individual clamping body 32 to the connecting element 2 or the webs 33 thereof can take place in each case, with the result that the clamping force per steel cable 13 can be increased and thus the force-fitting connection as a whole improved.

Figure 8:
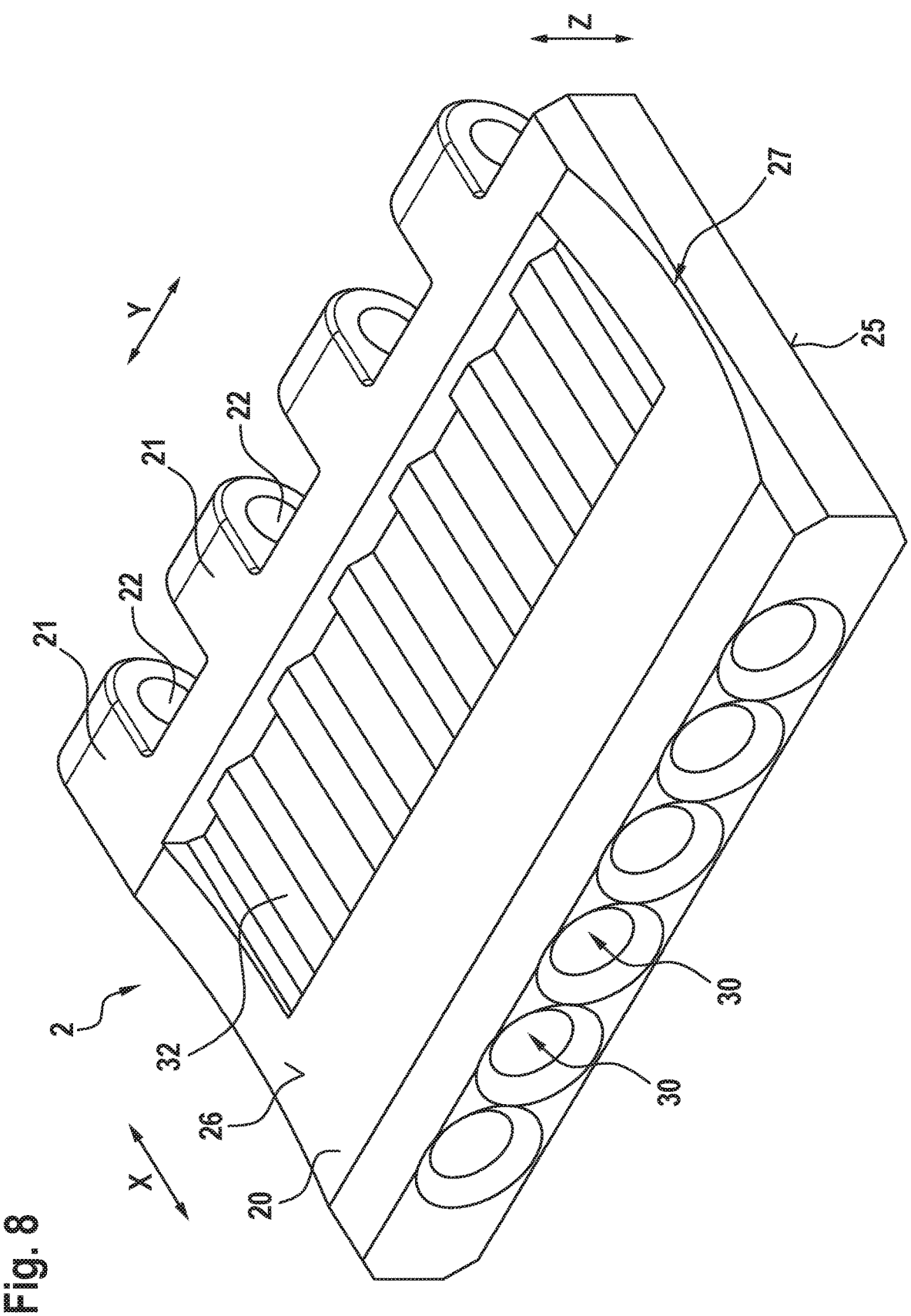
FIG. 8 shows a perspective schematic illustration from below of a connecting element with a clamping body, according to a third embodiment.
Figure 9:
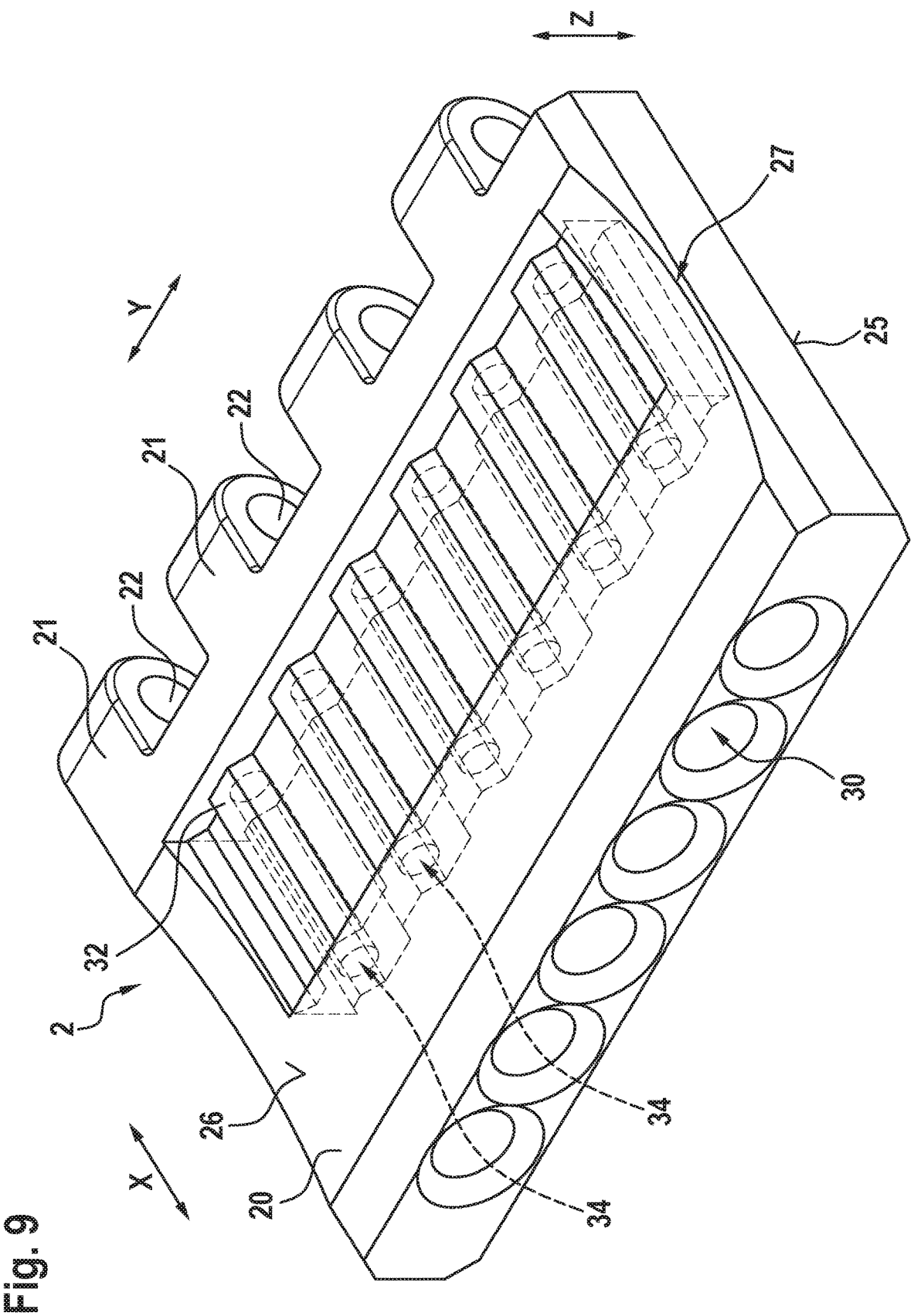
FIG. 9 shows a transparent illustration of FIG. 8.

FIG. 8 shows a perspective schematic illustration from below of a connecting element 2 with a clamping body 32, according to a third embodiment. FIG. 9 shows a transparent illustration of FIG. 8.

The connecting element 2 according to the third embodiment differs from the connecting elements 2 according to the previous two embodiments in that the strength member leadthroughs 30 are embodied in the form of bores 30 through the main body 20. As a result, the stability of the connecting element 2 can be increased, because the forces acting on the steel cables 13 can be transmitted uniformly all around the bores 30. However, during assembly, it is necessary to introduce the ends 14 of the steel cables 13 into the strength member receptacles 34 through the bores 30 (cf. FIG. 9). To this end, the clamping body 32 needs to be positioned in the clamping body receptacle 31 beforehand. Furthermore, the press-fitting of the ends 14 of the steel cables 13 in the clamping body 32 and at the same time the press-fitting of the clamping body 32 to the connecting element 2 has to take place in the connecting element 2 or the clamping body receptacle 31 thereof. To this end, the clamping body receptacle 31 is configured to be upwardly and downwardly open in its height Z, in order that a pressing tool can exert the pressing force from one side with respect to a workpiece receptacle from the other side.

Figure 10:
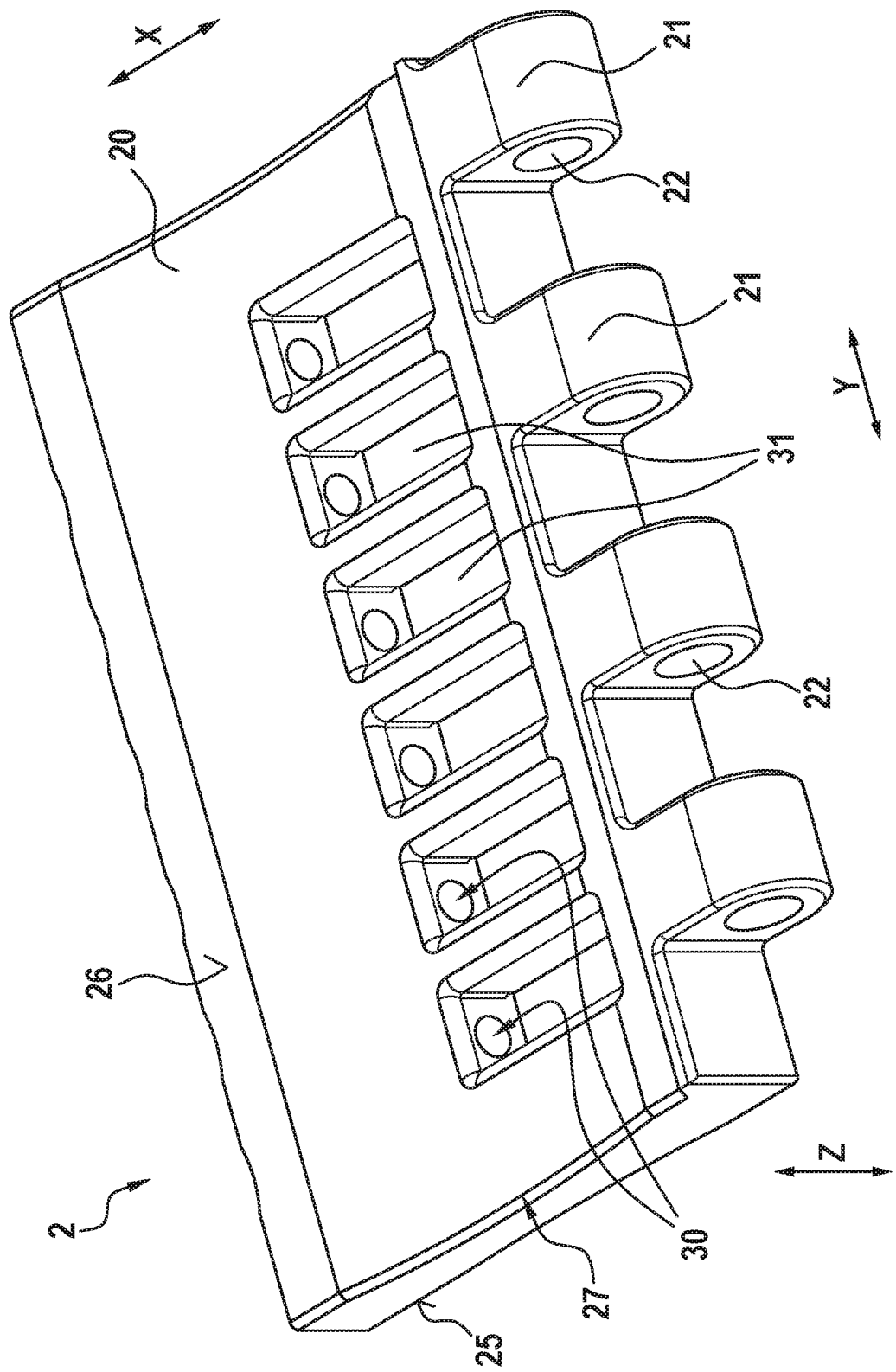
FIG. 10 shows a perspective schematic illustration from below of a connecting element by itself, according to a fourth embodiment.
Figure 11:
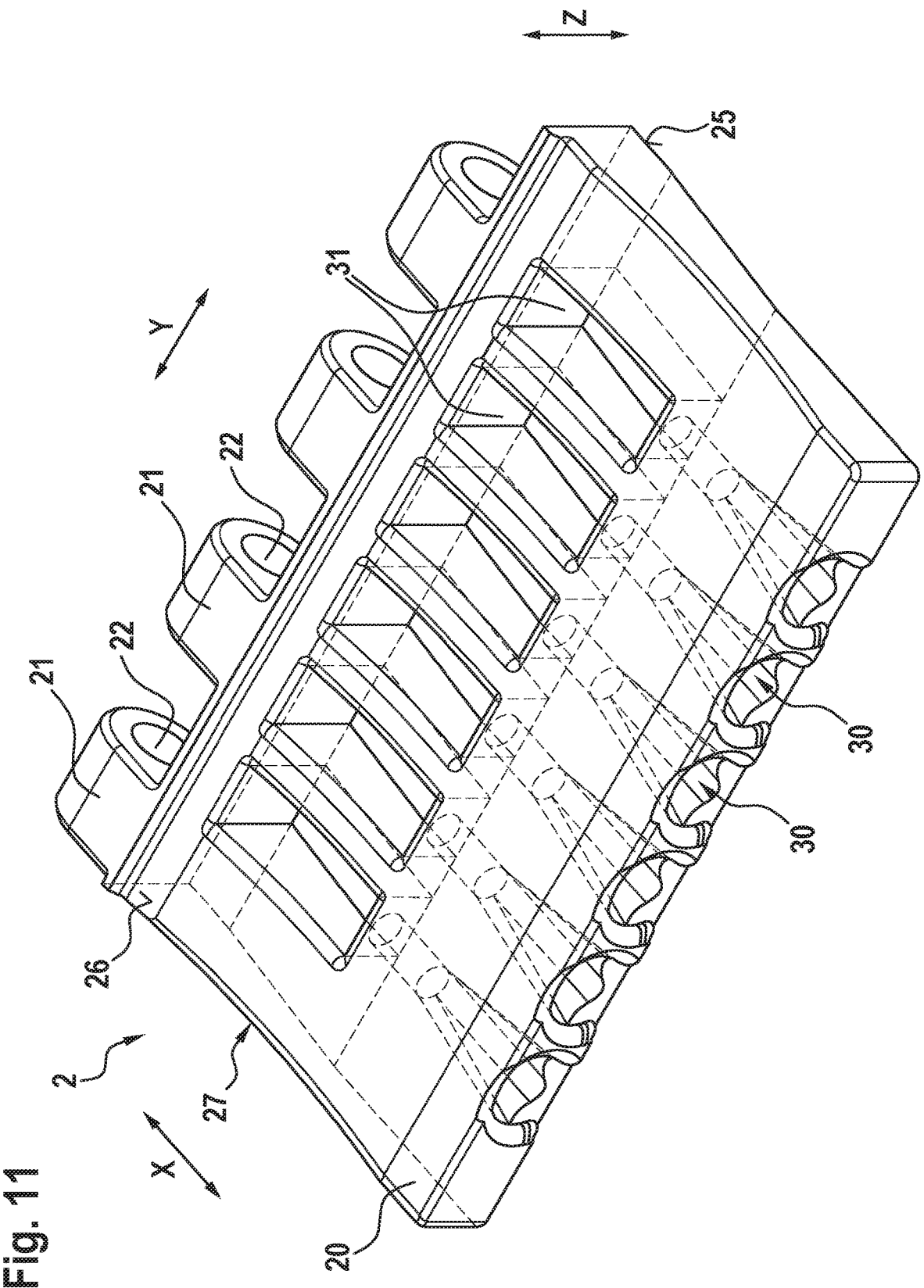
FIG. 11 shows a transparent illustration of FIG. 10.
Figure 12:
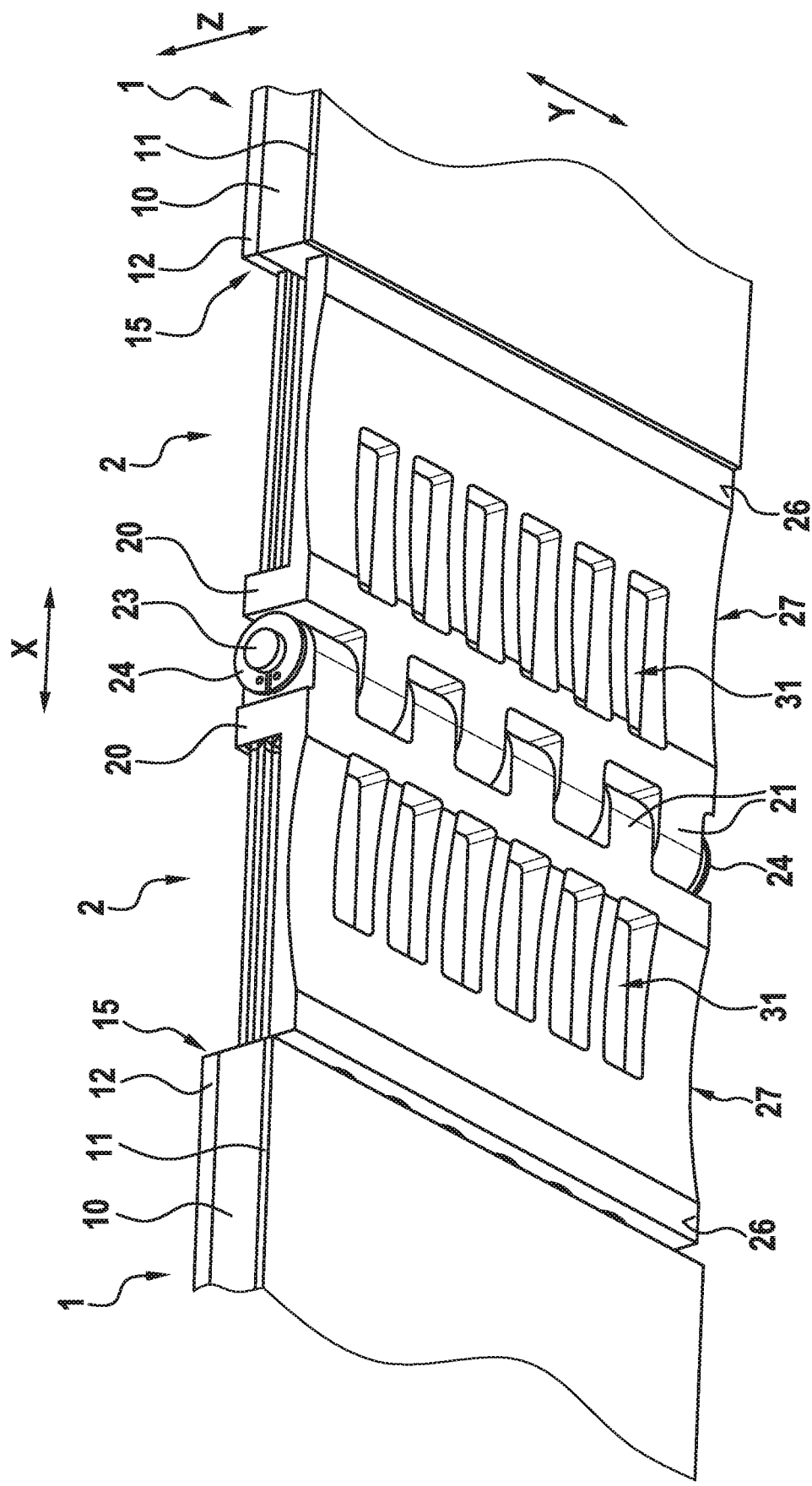
FIG. 12 shows a view from below of a belt closed in an endless manner with connecting elements according to the fourth embodiment; and, FIG. 13 shows a perspective schematic illustration from above of the connecting element according to the fourth embodiment with strength members and clamping bodies.
Figure 13:
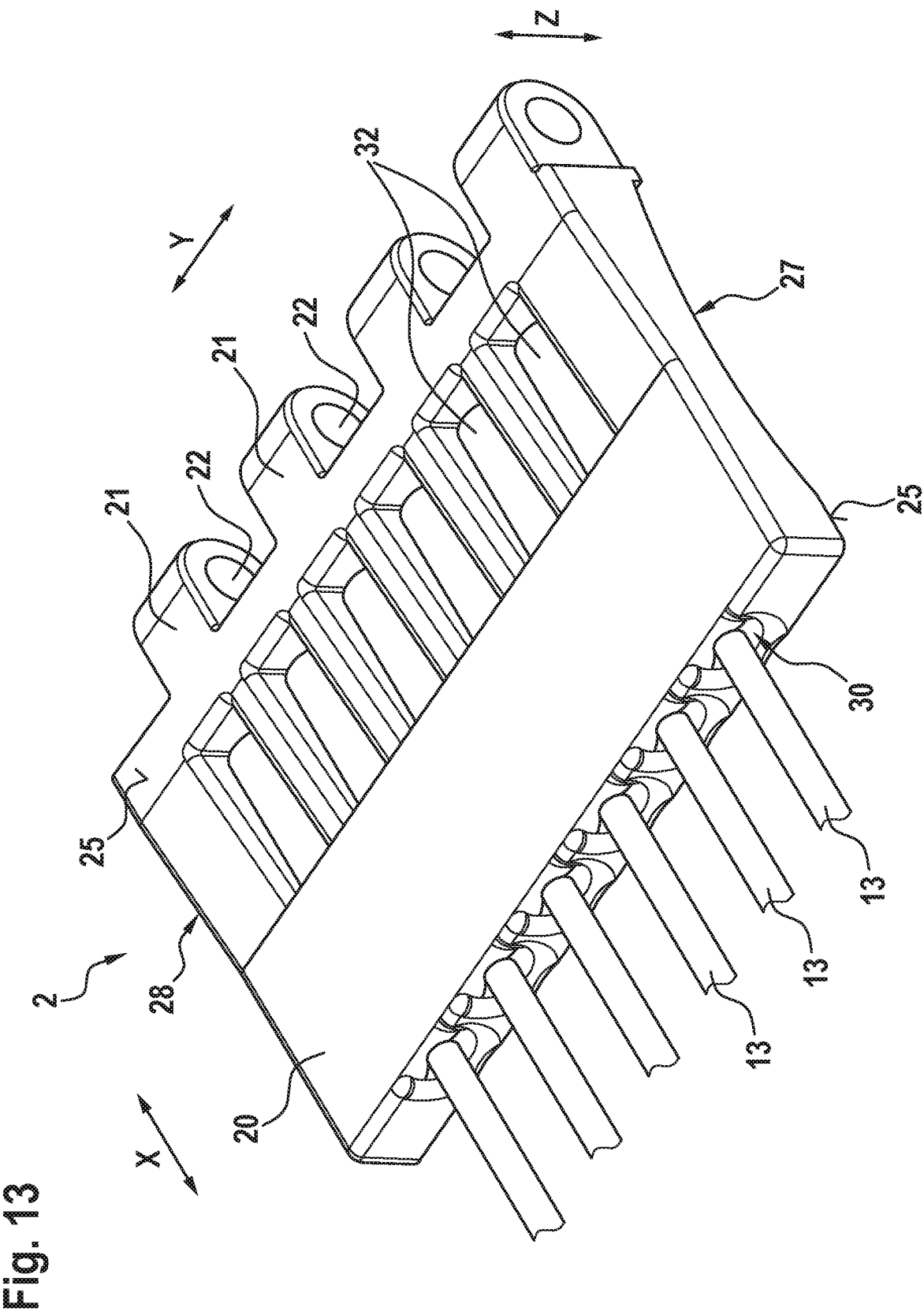

FIG. 10 shows a perspective schematic illustration from below of a connecting element 2 by itself, according to a fourth embodiment. FIG. 11 shows a transparent illustration of FIG. 10. FIG. 12 shows a view from below of a belt 1 closed in an endless manner with connecting elements 2 according to the fourth embodiment. FIG. 13 shows a perspective schematic illustration from above of the connecting element 2 according to the fourth embodiment with strength members 13 and clamping bodies 32.

The connecting element 2 according to the fourth embodiment differs from the connecting elements 2 according to the previous three embodiments both in that the strength member leadthroughs 30 are configured in the form of bores 30 through the main body 20 and in that the webs 33 are present between the individual clamping body receptacles 31.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

X Longitudinal direction of the belt 1 or belt segment 1
Y Transverse direction or width of the belt 1 or belt segment 1
Z Height or thickness of the belt 1 or belt segment 1
1 Belt or belt segment
10 Elastomeric main body
11 Lower elastomeric cover layer
12 Upper elastomeric cover layer
13 Strength members, or steel cables
14 End of the strength members 13
15 Belt end or belt segment end
2 Connecting elements
20 Main body
21 Crenelated protrusions
22 Transverse bores of the crenelated protrusions
23 Coupling bar
24 Coupling bar securing means
25 External belt side or top side of the main body 20
26 Internal belt side or underside of the main body 20
27 Concavity of the underside 26
30 Strength member leadthrough of the main body 20, bore or groove
31 Clamping body receptacle
32 Clamping body
33 Webs of the main body 20 in the longitudinal direction X
34 Strength member receptacle of the clamping body 32 or clamping bodies 32
35 Cover

What is claimed is:

1. A belt or belt segment comprising:
   a plurality of strength members each having a strength member end;
   the belt or belt segment having a first end and a second end and defining a longitudinal direction (X);
   said strength members extending in the longitudinal direction (X) and being arranged parallel to one another;
   a connecting element which forms said first end of the belt or belt segment and is configured to be connected to a further connecting element at said second end of the belt or to an end of a further belt segment;
   said strength member ends being held by said connecting element;
   at least one clamping body;
   said strength member ends being connected to said at least one clamping body in a force-fitting manner; and,
   said connecting element being configured to hold said at least one clamping body in a force-fitting manner at least in the longitudinal direction (X).

2. The belt or belt segment of claim 1, wherein:
   said clamping body includes a first material;
   said connecting element includes a second material; and,
   said first material is softer than said second material.

3. The belt or belt segment of claim 1, wherein at least two of said strength member ends are connected to a common clamping body in a force-fitting manner.

4. The belt or belt segment of claim 1, wherein at least two of said strength member ends are each connected individually to one of said at least one clamping bodies in a force-fitting manner.

5. The belt or belt segment of claim 1, wherein said connecting element has at least one clamping body receptacle configured to receive and hold, in a force-fitting manner at least in the longitudinal direction, at least one strength member end provided with one of said at least one clamping bodies.

6. The belt or belt segment of claim 5, wherein said clamping body receptacle is configured to receive a clamping body having strength member ends of a plurality of said strength members connected thereto in a force-fitting manner.

7. The belt or belt segment of claim 5, wherein said clamping body receptacle is configured to receive a clamping body having one strength member end of one of said strength members connected thereto in a force-fitting manner.

8. The belt or belt segment of claim 5 further comprising:
a web extending in the longitudinal direction (X);
said connecting element having two clamping body receptacles;
each of said two clamping body receptacles being configured to receive and hold, in a force-fitting manner at least in the longitudinal direction (X), at least one strength member end provided with a clamping body; and,
said two clamping body receptacles being separated from one another in a transverse direction (Y) by said web.

9. The belt or belt segment of claim 5, wherein said connecting element has at least one strength member leadthrough configured to have at least one strength member pass therethrough in the longitudinal direction (X) into said clamping body receptacle.

10. The belt or belt segment of claim 9, wherein said strength member leadthrough is configured as a bore through said connecting element.

11. The belt or belt segment of claim 9, wherein said strength member leadthrough is configured as a groove through said connecting element.

12. The belt or belt segment of claim 11, further comprising a cover configured to close at least one of said groove and said clamping body receptacle perpendicularly to the longitudinal direction (X).

13. The belt or belt segment of claim 9, wherein said strength member leadthrough is configured in a widened manner in the longitudinal direction (X) in a direction away from said strength member ends.

14. The belt or belt segment of claim 1 further comprising:
an elastomeric main body including a main body material;
said strength members being embedded in said elastomeric main body; and,
said strength member ends not being covered by said main body material.

15. The belt or belt segment of claim 1, wherein said connecting element has a semicircular concavity on an internal belt side thereof.

* * * * *